D. C. McROBERTS.
METHOD FOR MAKING INNER TUBES AND THE LIKE.
APPLICATION FILED JUNE 8, 1921.

1,406,669.                                     Patented Feb. 14, 1922.

Inventor.
Donal C. McRoberts,
By his Attorney,
Ernest Hopkinson

UNITED STATES PATENT OFFICE.

DONAL C. McROBERTS, OF INDIANAPOLIS, INDIANA, ASSIGNOR TO G & J TIRE COMPANY, A CORPORATION OF INDIANA.

METHOD FOR MAKING INNER TUBES AND THE LIKE.

1,406,669.    Specification of Letters Patent.    Patented Feb. 14, 1922.

Application filed June 8, 1921. Serial No. 475,854.

*To all whom it may concern:*

Be it known that I, DONAL C. McROBERTS, a citizen of the United States, residing at Indianapolis, county of Marion, and State of Indiana, have invented certain new and useful Improvements in a Method for Making Inner Tubes and the like, of which the following is a full, clear, and exact description.

This invention relates to the manufacture of hollow plastic articles and more particularly tubular articles of rubber composition, such as inner tubes for pneumatic tires, being a continuation in part of my allowed application No. 367,243, filed March 19th, 1920.

At the present day, inner tubes are manufactured to a large extent commercially from sheets of vulcanizable rubber which are individually rolled about a hollow tube or pole, then enclosed in a sheet of fabric, termed a "jacket", of a width approximately equal to the circumference of the plastic on the pole, then bound tightly by spiral convolutions of a strip of fabric, and finally vulcanized.

The present invention aims to eliminate the jacket and thereby to reduce the cost of production and to make a tube with a stronger longitudinal seam.

Briefly, elimination of the jacket is rendered possible by coating the rubber composition after it is formed upon a pole or mandrel with a material such as mica which will enable a tube of green stock to be immediately wrapped in strips of fabric or tape in spiral convolutions. After vulcanization the strips of fabric or tape may be unwound without breaking or leaving ravellings embedded therein. The finish of a tube so manufactured is smooth enough for the trade. Moreover, the tube is turned inside out before its ends are spliced together and the finish of the wrapped surface is not a matter of consequence as long as the requisite strength is obtained.

Elimination of the jacket effects a desirable reduction of the cost of production. The jackets are perishable and costly and thousands are used daily. Further, dispensing with the jacket avoids a step in the prevailing method of manufacture and saves the time required heretofore to put it on. And the substitution of a mica coating for a jacket does not require the rubber composition to be altered as substantially the same plastic composition may be employed, if desired.

Figure 1:
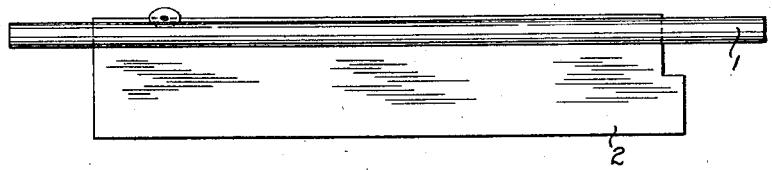
Fig. 1 is a plan view of a sheet of stock, showing the pole about to be rolled thereover.
Figure 2:
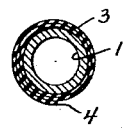
Fig. 2 is a section showing the green tube after it has been plied up by rolling.
Figure 3:
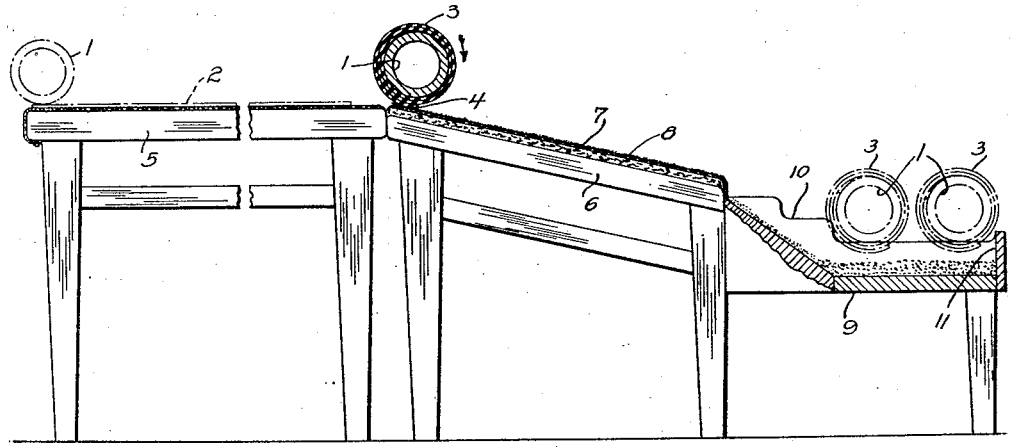
Fig. 3 is an elevation partly in section of a preferred form of mica-applying table.

According to the present invention vulcanizable rubber composition is first formed tubular, and preferably cylindrical in cross-section. This may be done in any desired way, but preferably as usual, by wrapping on a hollow tube or "pole" 1 a sheet of plastic 2 which is wide enought to form two or more plies or thicknesses.

The formed inner tube 3 of rubber composition is then coated with mica, or an equivalent material having like lubricating action after vulcanization to render its outer surface less tacky or adhesive. The mica may be applied as desired but preferably so as not to coat the region of the external seam or shoulder 4, the absence of mica at this region permitting the rubber to blend and soften during vulcanization and thereby secure a sound longitudinal seam unlikely to split. I have found it convenient to employ adjacent the flat rolling table 5, an inclined coating table 6 on whose surface is laid a layer of felt 7 which is covered with a sheet 8 of any suitable imperforate and smooth material, such as rubber. After plying up the sheet 2 on the table 5, the formed tube on the pole is passed to the highest edge of the table 6 and rolled, or allowed to roll, over the surface of the sheet 8 which has been dusted with mica. In this operation, preferably the shoulder or seam 4 is disposed in the relation shown so that the mica is prevented from collecting thereat. At the lower side of the inclined table 6 is arranged a trough 9 which is flanked by notched or shouldered side pieces 10. On these the bare ends of the pole 1 successively drop down and shake off the excess mica, which excess, of course, collects in the trough 9 for redistribution as required over the surface of the table 6. A stop 11 is preferably provided at the far side of the trough 9 to halt movement of the poles owing to the momentum they have acquired.

Figure 4:
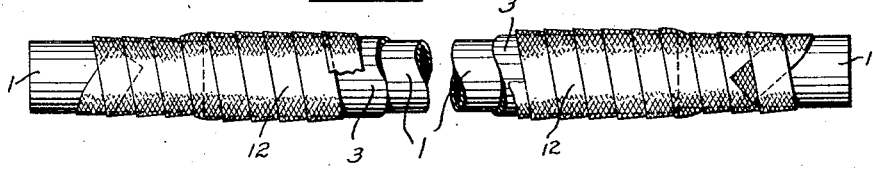
Fig. 4 illustrates the manner of spirally wrapping the green tube with a tape after its exterior has been coated with mica.

The tube formed and coated with mica is now ready to be wrapped spirally with a strip of fabric 12 preferably, but not necessarily, a tape with selvaged edges applied under tension. The preferred form of the wrapping is indicated in Fig. 4 and may be effected by rotating the mandrel or pole and leading the strip thereto from any suitable source of supply at an angle such that the edges of the several convolutions overlap.

Then the inner tube thus formed, coated and wrapped on a pole, is cured in a steam heater or in any other suitable apparatus, or by any other method. After curing the wrapping about the inner tube is removed and the tube stripped from the pole. The fabric or tape may be removed with facility without leaving ravellings embedded therein and without breaking.

While the maximum advantages of the invention are realized when the tubes or other rubber articles are cured while confined by fabric, some of the advantages of the invention may be realized when the tubes are cured without any wrapper in contact therewith, i. e., when the tubes are wrapped or stored away for an hour or so, so as to allow them to set before removing the wrapper and taping their ends only preliminary to their cure. And while mica has been found satisfactory for coating the plastic before direct spiral wrapping with a fabric strip, the invention in its broadest aspects contemplates the use of any equivalent silicates of aluminum and magnesium or of other materials or combinations of materials which will dispense with the necessity of using a fabric jacket between the convoluted wrapping on the inner tube. The mica, for instance, may be blended or adulterated with other and cheaper materials without departing from the spirit of my invention. Reference should, therefore, be made to the annexed claims for an understanding of the scope of the present invention.

Having thus described my invention, what I claim and desire to protect by Letters Patent is:

1. A method of making tubular articles of vulcanizable rubber composition which includes, forming the plastic tubular on a mandrel, coating the exposed surface of the plastic tube with mica, wrapping a fabric strip under tension spirally about the coated plastic tube and in contact therewith, setting the article thus formed and confined, and finally removing the spiral convolutions of strip fabric.

2. A method of making hollow articles of rubber composition which includes, forming the article on the external surface of a mandrel, coating the exposed surface of the article with mica, wrapping a tape with selvaged edges under tension in overlapping convolutions about the article and in direct engagement with its exposed face, vulcanizing the article while under confinement by the tape, and finally removing the tape and stripping the article from the mandrel.

3. A method of making tubular articles of vulcanizable rubber composition which includes, plying up a sheet of vulcanizable rubber composition on a mandrel, coating the exposed surface of the resulting tube with a mica excepting immediately adjacent the exposed seam, confining the thus coated tube with fabric under tension, and vulcanizing the tube thus confined on the mandrel.

4. A method of making tubular articles of vulcanizable rubber composition which includes, plying up a sheet of vulcanizable rubber composition on a mandrel, coating the exposed surface of the resulting tube with a micaceous substance excepting immediately adjacent the exposed seam, shaking the thus coated tube, confining the coated tube with spiral convolutions of a fabric strip under tension and in immediate contact therewith, vulcanizing the tube thus confined, and finally removing the fabric strip.

Signed at Indianapolis, Indiana, this 23 day of May, 1921.

DONAL C. McROBERTS.